June 23, 1942. C. W. FLOSS Re. 22,125

AUTOMATIC HONING MECHANISM AND CONTROL MEANS THEREFOR

Original Filed Feb. 15, 1938 2 Sheets-Sheet 1

INVENTOR
CARL W. FLOSS
BY Sawyer, Tuge & Hardesty
ATTORNEYS

June 23, 1942. C. W. FLOSS Re. 22,125
AUTOMATIC HONING MECHANISM AND CONTROL MEANS THEREFOR
Original Filed Feb. 15, 1938 2 Sheets-Sheet 2
FIG.3.
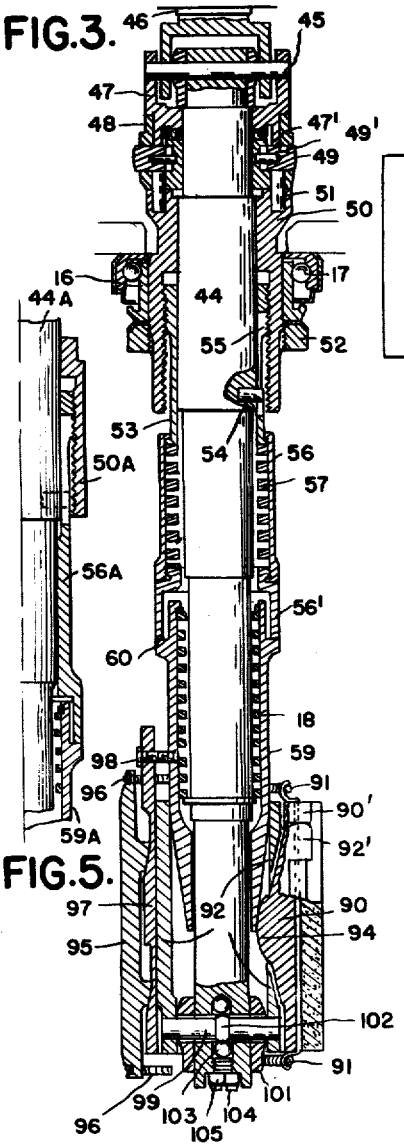
FIG.5.
FIG.4.
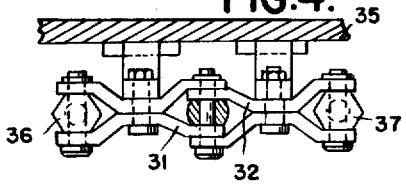
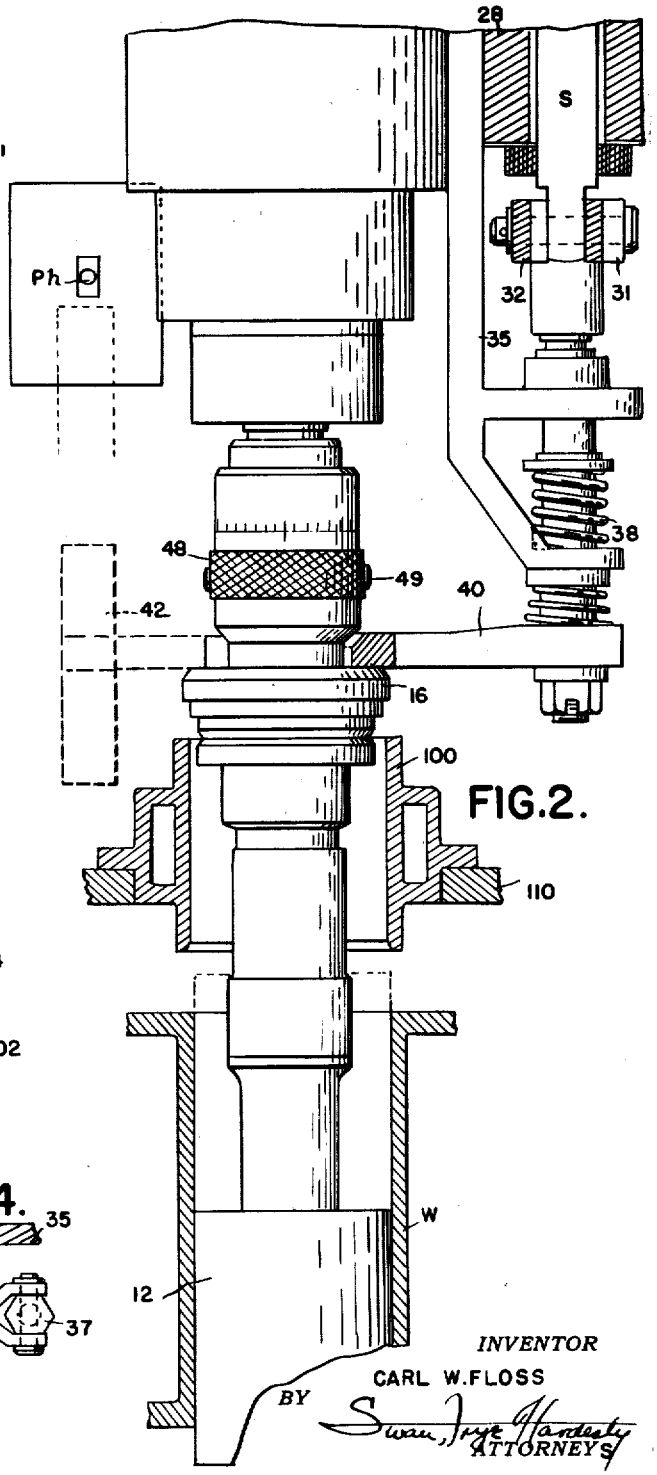
FIG.2.
INVENTOR
CARL W. FLOSS
BY Swan, Dye & Handsley
ATTORNEYS Reissued June 23, 1942 Re. 22,125

UNITED STATES PATENT OFFICE 22,125

AUTOMATIC HONING MECHANISM AND CONTROL MEANS THEREFOR

Carl W. Floss, Detroit, Mich.

Original No. 2,164,811, dated July 4, 1939, Serial No. 190,665, February 15, 1938. Application for reissue August 19, 1940, Serial No. 353,319

14 Claims. (Cl. 51—34)

This invention relates to machine tools, and to automatic controlling means for regulating the operation thereof. An object of the invention is to provide improved and simplified means whereby a honing tool or the like having a working portion capable of a plurality of distinct motions may be cyclically controlled and driven in a manner assuring performance of the several required motions or operations in desired sequence, and which controls the duration and working pressures of the various operations.

A further object is to provide automatic controlling means of the character indicated which is especially adapted for use in conjunction with a tool of collapsible form, having a working element which must be fed into the work longitudinally in a preliminary feeding motion, and then extended laterally in a second feeding motion which must take place in a different direction and also be accurately controlled, while in addition the tool must be rotated during operation.

A further object is to provide such automatic controlling means of extremely simple and relatively inexpensive character, capable of continuously controlling the working periods and travel of the hones or other tool means, and which in addition permits convenient adjustment of the initial settings and extent of movement of the tools or hones and which, further, keeps the operator constantly apprised of the working conditions, and automatically stops the machine and collapses and retracts the working heads or tools after completion of the work.

Still another object is to provide improved mounting means for the stones of a honing device, capable of a plurality of distinct motions as above outlined, which mounting means incorporates driving mechanism arranged to draw rather than push the stones along the work, in both directions of reciprocating travel, obviating all tendency of the hones to rock in an unwanted manner while working.

Still another object is to provide improved means for compensating and taking up wear which may occur in the tool mounting mechanism, and for adjustably controlling the operating pressures of the tools.

An additional object resides in the provision, in a honing head having collapsible and expansible stones, of improved guide means, automatically extensible concurrently with retraction of the stones, and vice-versa, for guiding the tool into and from the work, guarding the work against unwanted engagement of the tool therewith, and eliminating the danger of scratching.

Still another object includes the provision of an improved honing head incorporating novel simplified and extremely flexible adjusting means whereby the settings of its several components may be varied, as well as the provision of such a head which allows limited universal movement between the head and its driving shank, and similar movement between such shank and the expander cam by which the stones are driven outwardly.

Other objects and advantages will be apparent from the following description, wherein reference is made to the accompanying drawings, illustrating a preferred embodiment of my invention and wherein similar reference numerals designate similar parts throughout the several views.

In the drawings:

Figure 2 is a vertical sectional view taken substantially on the line 2—2 of Figure 1 and looking in the direction of the arrows.

Figure 3 is a vertical and substantially diametric longitudinal sectional view of one of the honing heads and its supporting means, taken substantially on the line 3—3 of Figure 1.

Figure 4 is a detailed sectional plan view of the toggle means employed in the magnetically operated hone collapsing and expanding mechanism, taken substantially on the line 4—4 of Figure 1 and looking in the direction of the arrows; and Figure 5 is a sectional detail of a part of a modified hone supporting assembly.

Figures 1, 1A:
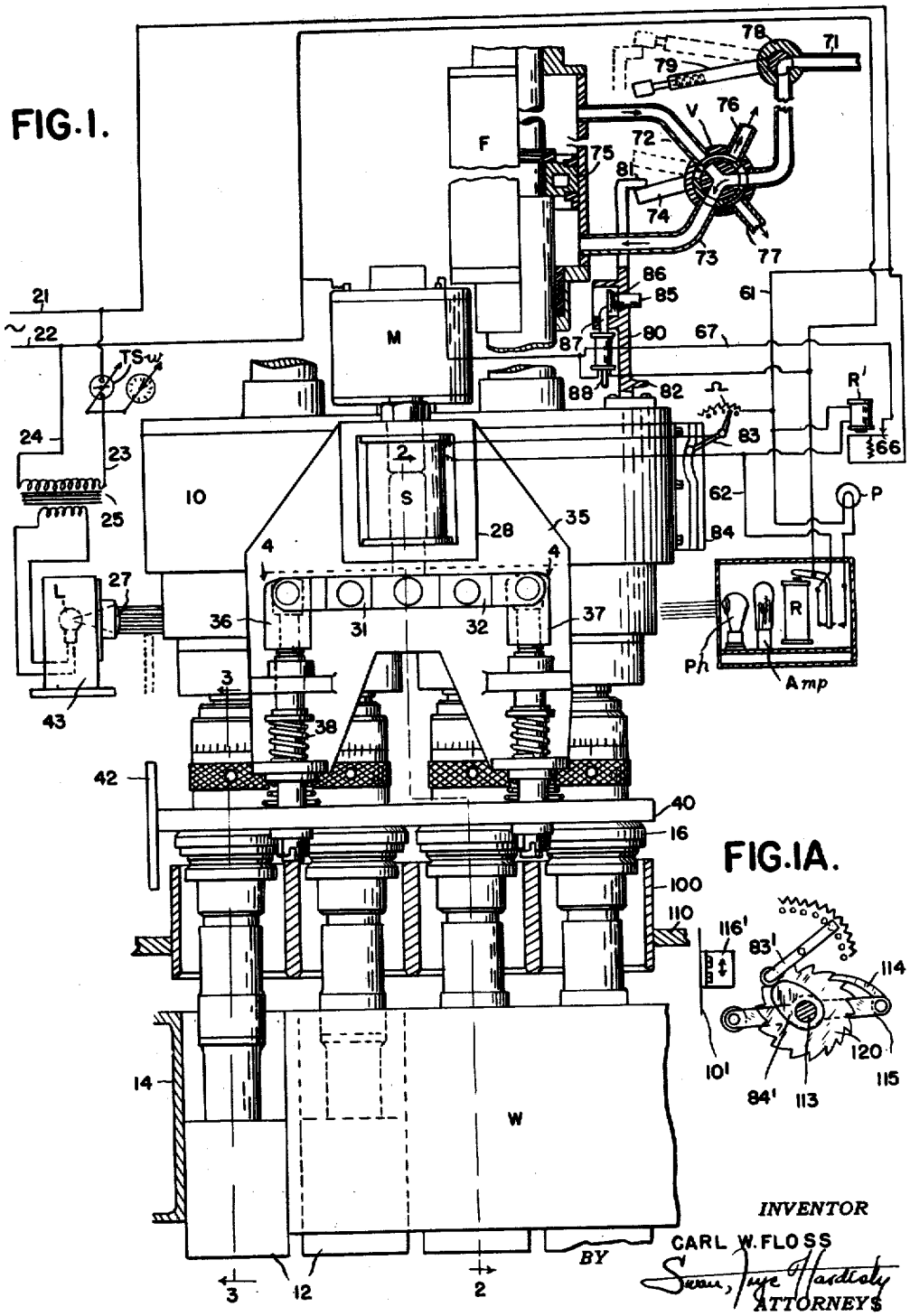
Figure 1 is a somewhat diagrammatic front elevational view of a honing machine constructed and arranged in accordance with this invention, schematically showing electrical controlling means and the connections thereof, parts being broken away and shown in section.
Figure 1A is a somewhat diagrammatic fragmentary elevational view of a somewhat modified stone-pressure controlling mechanism.

Referring now to the drawings, it will be seen that my invention is illustrated as applied to a honing machine of generally conventional arrangement, which rotates and moves the hone assemblies 12 up and down in the bores of the work, shown as a cylinder block, W. The mechanism also includes means for expanding the honing stones into engagement with the work and collapsing or retracting them. Although the machine illustrated is indicated as equipped with four honing heads, this and the details of its construction are of course matters of choice and engineering design with which the invention is not essentially concerned. Reciprocation of the head to move the tools vertically is induced by a fluid motor F, comprising a cylinder and piston assembly. The piston is mounted upon a rod to which the vertically movable head 10 of the machine is directly connected. An electric motor M is provided to rotate the hones, which are driven through gearing (unshown) housed in the head 10.

Each hone assembly carries a thrust collar 16 slidable with respect to the spindle upon which the hone is mounted. Downward sliding movement of the collar with respect to the spindle acts to expand the stones into contact with the cylinder bore in the work, while the collar moves upward as the stones collapse to free them from the work.

For the sake of clarity the nature of the hone assemblies and other components of the machine have been preliminarily outlined in a general way only. Their operating cycle and the automatic controlling means will next be considered, whereafter structural details will be taken up.

It is most desirable, in operating such a honing machine, to determine in advance the length of time the hones should run to remove the required amount of material from the work, at the desired operating speeds and pressures. The operating cycle comprises first feeding the hones into the work with the stones collapsed, expanding the stones into engagement with the work and maintaining such engagement with desired pressure while rotating the hones for a desired period, then collapsing and retracting the hones and freeing the work for removal and replacement. This cycle is initiated by manual closing of a switch by the operator. The switch is timed and the machine stops when all operations are completed.

The controlling action is achieved through electrical means schematically shown in Fig. 1. Current is supplied from a suitable source (unshown) of electrical energy, through feed wires 21, 22. From these, power take-off leads 23, 24 energize a light source shown as an incandescent bulb L. This circuit is controlled by a time switch assembly designated TS*w*, which may be set to maintain the circuit closed for any desired interval of time, and then to open it automatically. The light L is shown as supplied through a transformer 25, while a lens 27 is provided to condense the light into the form of a beam trained upon a photoelectric cell P*h*.

The hones are expanded into contact with the work by a solenoid S. The core 28 of the solenoid is articulated to toggle levers 31, 32, centrally pivoted on a mounting plate 35 attached to the head of the machine. At their outer ends the toggle levers are articulated to vertically movable slides 36, 37, mounted to travel in guide brackets on plate 35. Each slide is returnable by a spring 38. At their lower ends the slides are attached to a horizontal plate 40, which, when urged downwardly by energization of the solenoid, bears against and forces down all of the thrust elements 16. The thrust elements are mounted on ball bearings 17, and do not rotate with the hone shafts. One terminal of the solenoid is connected to power line 21, through a potentiometer, Ω, or other voltage control, by a wire designated 61, the other terminal of the solenoid being connectible to the other power line 22, through a wire 62, and a relay R in series therewith, which controls its operation. The relay closes to connect wire 62 to feed conductor 22 when the light from source L falls upon the photoelectric cell P*h*. When the light is interrupted, the relay moves to an opposite position, disconnecting the feed line 22 from the conductor 62 and connecting such feed line to a pilot light P, whose other terminal is directly connected to the other power lead through conductor 61.

Connected in parallel with the solenoid and also controlled by the relay R, is a motor-control relay R′, which closes the circuit to motor M when the solenoid is energized. The energizing electromagnet of relay R′ will be seen to be connected to wires 61, 62, the former directly connected to feed wire 21, and the latter connected to the main relay R, which controls its connection to the feed wire 22. Relay R′ acts as a magnetic switch, its contact arm 66 making and breaking the connection between motor M and feed line 21, the switch being connected with the motor M by a conductor 67.

The photocell is shown as assembled with the relay R, and connected thereto through an amplifier, only the thermionic tube of which is shown, and generally designated *Amp*. The connections and details of these elements being well known, and forming in themselves no part of the present invention, are not shown. Such an assembly of photoelectric cell, amplifier and relay suitable for this purpose is in fact available on the market, being commercially known as a photoelectric relay.

A plate 42 carried by the thrust plate 40 travels through the path of the light beam as the head 10 moves vertically to and from its fully elevated rest position in which the hones are retracted from the work. The light is normally extinguished by the time switch rather than being cut off by plate 42, although when the head is fully raised, the plate lies in the path of the light beam. The plate is of such length as to remain in the path of the light beam as the head descends, upon starting of the machine, until the hones are in the bores of the work. The stones are thus prevented from expanding until the hones have reached a desired position.

The machine when at rest stands with the head so raised, and to initiate the operation, the switch TS*w* must be held closed manually long enough to allow the head to descend far enough so that the plate passes out of the path of the light beam, which then falls upon the photocell P*h*, causing closure of the motor and solenoid circuits as described. Due to the presence of the plate, such circuit closure cannot occur until the hones are in the work. During normal reciprocation of the head during honing, the plate is always below and out of the path of the light beam, never rising high enough to cut off the beam until it is lifted toward rest position to remove the hones from the work at the completion of the operating cycle. When started, the operation continues automatically until the switch opens, which will cause the relay R to break the motor and solenoid circuits, allowing the stones to collapse and stopping the motor M.

The fluid motor by which the head is fed vertically is connected through a valve V and feed pipe 71 to a suitable source (unshown) of fluid pressure. The valve is adapted to direct the fluid alternately to the space above and the space below the piston 75, by means of conduits 72, 73. The valve is rockable for this purpose by an arm 74, the arrangement being such that when the valve arm is lifted to its upper position, the piston is forced downwardly to depress the head, due to delivery of fluid to the top of the cylinder through pipe 72, then connected to feed pipe 71 by the valve. The space below the piston is at such time connected to return pipe 77, which may either exhaust the fluid or return it to the source or storage reservoir (unshown). When the valve arm 74 is moved down to the position in which it is shown in full lines in Figure 1, fluid is fed to the space below the piston to raise the head and so the hones, pipe 73 being then connected to feed pipe 71, while the space above the piston may discharge through the return conduit 76 which is then connected to conduit 72 by the valve. The valve is automatically actuated by lugs 81, 82, 85 projecting laterally from an arm 80 upstanding from the head. The lug 85 is retractable and constantly urged to that position, in which it cannot engage the valve arm, by a spring 86, although it may be locked in its projected, operative position by a latch member 87 actuable by a solenoid 88. Solenoid 88 is shunted across the circuit of a motor M and energized concurrently, to project the latch and maintain the lug 85 in the outer, operative position (in which it is initially manually set by the operator), so long as the motor is energized. Lugs 81, 85 define the operative travel of the head and hones during the actual performance of the honing operation, the limit of upward head movement permitted by lugs 85 being insufficient to allow interruption of the light beam by plate 42. When the motor circuit is opened, however, solenoid 88 is deenergized, latch member 87 falls, and lug 85 being then retracted, the head rises until the stones are moved upwardly out of the work. Lug 81 then actuates a cut-off valve 78 arranged in the fluid feed line, stopping the piston in the raised position. In re-starting, the cut-off valve 78 may be opened by hand, its actuating arm 79 having a yieldably retractable end, whereby the arm may be moved down to open the valve despite the raised position of lug 81.

It will be seen that the pilot light P is lighted whenever the current which supplies the solenoid S is interrupted at the relay R. Thus if the light source L should fail, or be interrupted for any reason, the operator is immediately apprised of the fact. The potentiometer Ω furnishes convenient means whereby the stone pressure may be adjusted, enabling controlling the current delivered to the solenoid, and so regulating the expanding force exerted thereby upon the stones.

If desired, the potentiometer or voltage control may be regulated automatically during operation of the machine, rather than by hand. In Figure 1, the arm of the potentiometer is connected by means of a lever 83 and follower to plate cam 84 carried by and reciprocable with the head of the machine. As the head moves up and down, therefore, the potenitometer is actuated to control the solenoid in a desired manner in accordance with the designed contour of the cam. This will be seen to provide for variation of the working pressure during each stroke.

In the somewhat modified construction shown in Figure 1A, and utilizable either separately or in conjunction with the control arrangement just described, means are provided whereby the working pressure of the hones may be changed gradually throughout the honing operation, which may consist of numerous strokes of the head. The potentiometer arm 83' is actuable by a cam 84' rotatable on a fixedly positioned shaft 113 and actuable at any desired rate, which may be materially slower than the movement of the head 10' of the machine, as by means of a pawl 114 carried by a lever 115 rockable on shaft 113 and actuable by a striker 116 outstanding from the head of the machine to engage and actuate the lever during each complete up and down movement of the head. The pawl actuates a ratchet wheel 120 rotatable as a unit with the cam. The cam may be timed to rotate once, or to move to any desired extent, during each complete operating cycle of the machine, and it will be appreciated that in this manner the operating pressure may be made to change in any desired manner throughout such operating cycle.

The construction of the honing heads is best shown in Figure 3. A central spindle 44 is driven through a universal joint 45 from each of the shafts 46 which project downwardly from the head of the machine. As stated, these shafts are rotatable by the motor 10. Encircling the central spindle 44 is a sleeve assembly formed in a plurality of sections. The upper section 47 is locked to the central shaft by the pin of joint 45. An adjusting sleeve 48 encircles a part of the section 47, and is rotatable relatively thereto but normally locked against such rotation by locking mechanism constructed in accordance with the disclosure of my Patent No. 1,854,251, issued April 19, 1932. A notched portion 47' of the sleeve section 47 normally projects upon either side of the spring pressed plunger 49, which is slidable in the sleeve section 48, holding the latter sleeve against turning. When the plunger is depressed, however, a notch 49' therein registers with the depending notched portion 47' to free sleeve 48 for rotation. Vertical pins 51 key sleeve 48 to the section 50 arranged therebelow, allowing the latter section to move downwardly away from section 48, although requiring them to rotate together when sleeve 48 is turned for adjustment in the manner described. Section 50 carries the thrust race 16, which is supported from beneath by its ball bearing 17 and adjustably fixed in its vertical position by a nut 52. Threadedly interfitted with sleeve 50 is a sleeve section 53 which is keyed to rotate with the shaft 44 but slidable longitudinally with relation thereto, being provided with a slot 55 slidably engaging a pin 54 projecting from the shaft. Rotation of the adjusting sleeve will be seen to telescope section 53 more or less with respect to section 50, changing the effective length of the entire sleeve assembly. The downward continuation 56 of sleeve section 53 is slidably movable upwardly over section 53, but projected downwardly by a relatively heavy spring 57 which normally holds it at the limit of its movement, but by allowing retraction thereof under sufficient force defines the maximum engagement pressure. The spring reacts at its upper end against the section 53, and at its lower end forces downwardly the section 56 and a threadedly attached extension 56' thereof, the lower end of which bears downwardly upon a sleeve 59, having a tapered nose which acts as a cam to project the stone carriers 90 outwardly against the retracting effort of retracting springs 91.

The stone holders are radially slidable in the hone body 92 and each is provided with a rounded portion 94 projecting inwardly through an opening in the hone body and engageable by the tapered nose of sleeve 59, which may thus force and hold them outwardly. The stone holders are provided with lateral projections 90', at either end, between which fit driving portions 92' carried by the hone body and adapted to bear thereagainst, to drive the stones longitudinally of the bore. The driving portions 92′ which bear against the lateral projections 90′ are developed spherically about the rocking center or beam line of the stone, to allow rocking of the latter independently of the body.

Since the driving portions 92′ engage the stone holders near the ends of the latter, the effect is to draw rather than push the stones through the bore, in whichever direction the assembly is traveling, thus allowing the stones to adjust themselves freely to the contour of the bore, and preventing unwanted cocking and chattering.

Also radially slidable in the hone body are guide members or slippers 95, similarly retractable by coiled springs 96 encircling the assembly, and projectable by sliding cam plates 97, one arranged beneath each guide slipper. Such wedge-like sliding actuating cams are connected to sleeve section 59, as by a screw 98, to be actuable concurrently with the stones, but in a reverse direction (due to the opposite inclination of their actuating surfaces). It will thus be seen that downward pressure upon the sleeve assembly by the actuating plate 40, forces the stones outwardly and causes the guide slippers 95 to retract, while upward return movement of the sleeve assembly due to rising movement of the plate 40 results in expanding the guide members and retracting the stones, allowing the hone assembly to slide out of the bore without unwanted engagement of the stones therewith, which might cause scratching.

The drive is transmitted to the hone body by a pin 99 extending transversely through the end of the shaft 44. The transverse opening in the shaft is of such size as to allow limited universal rocking movement of the drive pin 99, and the hone body carried thereby, about the partly spherical centering and guide bushing 101 which is secured to the end of the shaft. A partly spherical enlarged central section 102 is also carried by pin 99 and engaged by balls 103 trapped above and below the same in a vertical central bore (undesignated) in shaft 44. Clearance between the section 102 and balls 103 is adjustable by a screw 104 provided with a jamb nut 105 and threaded into the bore to adjustably determine its size.

Limited universal motion is also provided between collar section 56′ and sleeve 59, which meet upon a partly spherical engaging surface designated 60, described concentrically about the rocking axis of the hone assembly.

Guide bushings 100 fixedly carried above the work and aligned with the bores therein by a platform 110 serve to properly align the hone assemblies as they are fed into the work.

As shown in Figure 5, spring 57 may be eliminated, and sections 53, 56, 56′ consolidated into a single rigid section, designated 56A in that view. Downward force exerted upon the thrust element 16 is thus transmitted unyieldingly to the stones, and the pressure with which the latter bear outwardly against the work is thus only limited by the force exerted by the solenoid. Other portions of the modified structure shown in Figure 5 being analogous to those already described, need no detailed redescription and have been given like reference characters to those already employed, distinguished by the addition of the letter "A" to each.

I claim:

1. In a machine tool construction in combination with a frame, a carriage movable in the frame, a head dismountable with relation to the carriage and movable therewith toward and from a position opposite but spaced from work to be operated upon, a working portion carried by said head and movable laterally into and from engagement with the work when said head is opposite the same, means for moving the carriage, electric motor means, carried by and movable with the carriage, for moving said head, separately controllable means, including a second electric motor means also carried by and movable with the carriage, for moving the working portion laterally, the head, by dismounting the same from the carriage, being separable from said means for moving the working portion laterally, an electric circuit including said first-mentioned electric motor means, a second electric circuit including said second electric motor means, means responsive to movement of the carriage for controlling one of said electric circuits and thereby the action of one of said motor means, and additional controlling means for the other of said circuits.

2. In a machine tool construction, in combination with a frame, a carriage movable in the frame, a head dismountable with relation to the carriage and movable therewith toward and from a position opposite but spaced from work to be operated upon, a working portion carried by said head and movable laterally into and from engagement with the work when said head is opposite the same, means for moving the carriage, separately controllable means for moving the head and for moving the working portion laterally, the head, by dismounting the same from the carriage, being separable from said means for moving the working portion, said means for moving the working portion including an electric circuit, electro-magnetic means controlled thereby for laterally moving the working portion to and from engagement with the work, and means responsive to movement of said head for controlling said circuit and thereby the lateral movement of the working portion.

3. In a machine tool construction, in combination with a frame, a carriage movable in the frame, a head dismountable with relation to the carriage and movable therewith toward and from a position opposite but spaced from work to be operated upon, a working portion carried by said head and movable laterally into and from engagement with the work when said head is opposite the same, means, carried by the carriage, for moving the head, separately controllable means for so laterally moving the working portion, the head, by dismounting the same from the carriage, being separable from said means for moving the working portion, said means for moving the working portion including electrically controllable motor means capable of actuating the same in both directions and of exerting variable force thereupon, electric controlling means for said motor means, and photoelectric means for operating said controlling means operable in response to movement of the head.

4. Means as set forth in claim 1 including separately controllable means for rotating the head, means including an electric circuit and a relay assembly for controlling rotation of the head, said relay assembly being connected in circuit with said last named means responsive to movement of the carriage, whereby rotation of the head and lateral movement of the working portion are automatically responsive to such first mentioned movement of the carriage toward and from said position opposite but spaced from the work.

5. In combination with a honing machine having a honing head, means for rotating and reciprocating such head in contact with work to be honed including timed electrical controlling means for limiting the duration of such rotating and reciprocating motion, said head having a laterally movable stone portion, electromagnetic means for moving such stone portion into engagement with the work, and voltage control means connected in circuit with said electromagnetic means and operable in response to reciprocation of the head to change the force developed by said electromagnetic means and thereby the engagement pressure of the stone means with the work.

6. In a honing machine, a frame, a hone assembly reciprocable therein, said hone assembly having a working portion movable laterally into and from engagement with the work, means for reciprocating the hone assembly, separately controllable means for moving said working portion laterally, and control means responsive to reciprocation of said hone assembly for controlling said means for moving the working portion laterally, said control means including an electric circuit, and a voltage controller therein for changing the effective pressure exerted to move said working portion laterally into engagement with the work, said controller being actuable by reciprocation of the hone assembly.

7. In a honing machine, a frame, a hone assembly reciprocable therein, said hone assembly having a working portion movable laterally into and from engagement with the work, means for reciprocating the hone assembly, separately controllable means for moving said working portion laterally, and control means responsive to reciprocation of said hone assembly for controlling said means for moving the working portion laterally, said means for moving the working portion laterally comprising a motor assembly capable of exerting variable pressure upon said working portion, said control means including an electric circuit for controlling the force exerted by said motor assembly, and control means for said electric circuit operable by reciprocation of the hone assembly.

8. In a honing machine, a frame, a hone assembly reciprocable therein, said hone assembly having a working portion movable laterally into and from engagement with the work, means for reciprocating the hone assembly, separately controllable means for moving said working portion laterally, and control means responsive to reciprocation of said hone assembly for controlling said means for moving the working portion laterally, said means for moving the working portion laterally comprising an electrically controllable motor assembly capable of exerting variable pressure upon said working portion, said control means including an electric circuit for controlling the force exerted by said motor assembly, and control means for said electric circuit operable by reciprocation of the hone assembly.

9. In a honing machine, a frame, a hone assembly reciprocable therein, said hone assembly having a working portion movable laterally into and from engagement with the work, means for reciprocating the hone assembly, separately controllable means for moving said working portion laterally, and control means responsive to reciprocation of said hone assembly for controlling said means for moving the working portion laterally, said means for moving the working portion laterally comprising electric motor means capable of exerting variable pressure upon said working portion, said control means including an electric circuit connected to said motor means, and control means for varying the current to, and thereby the effective force developed by, said motor means, said control means being operable by reciprocation of the hone assembly.

10. In a honing machine, a frame, a hone assembly reciprocable therein, said hone assembly having a working portion movable laterally into and from engagement with the work, means for reciprocating the hone assembly, separately controllable means for moving said working portion laterally, and control means responsive to reciprocation of said hone assembly for controlling said means for moving the working portion laterally, said means for moving the working portion laterally comprising an electromagnetic motor assembly capable of exerting variable pressure upon said working portion, said control means including an electric circuit connected to said electromagnetic motor assembly, and control means for varying the current to, and thereby the effective force developed by, said motor assembly.

11. In a honing machine, a frame, a hone assembly reciprocable therein, said hone assembly having a working portion movable laterally into and from engagement with the work, means for reciprocating the hone assembly, separately controllable motor means for moving said working portion laterally, means for controlling said motor means including an electric circuit and a current regulator therein arranged to control the degree of energization of and thereby the effort exerted by said motor means, and means responsive to reciprocation of the hone assembly for actuating said regulator.

12. In combination with a machine tool having a working head, means for reciprocating said head in a predetermined path during a machining operation, and for moving said head to a retracted position, a tool portion carried by and movable relatively to the head, electrically controllable operating means for so moving the tool portion with relation to the head, and electrical controlling means for said operating means including a photoelectric cut-off responsive to the position of said head, and means for varying the effective effort exerted by said operating means during reciprocation of the head.

13. Means as set forth in claim 1 in which said second electric motor means is capable of exerting variable effort upon said working portion to force said portion laterally into engagement with the work with different pressures, said additional controlling means comprising a current regulator, said means responsive to movement of the carriage being arranged to actuate said regulator and thereby control the rate of current flow in said second circuit, and resultantly the effort exerted by said second motor means.

14. Means as set forth in claim 1 in which said means for moving the working portion comprises an electromagnetically operable motor device, means connecting said motor device to the working portion, and a controller for said motor device operable by movement of said carriage to vary the effort exerted by said motor device.

CARL W. FLOSS.